United States Patent [19]

Sharp et al.

[11] 4,290,900

[45] Sep. 22, 1981

[54] METHOD AND COMPOSITION FOR REMOVING ELEMENTAL SULFUR FROM HIGH TEMPERATURE, HIGH PRESSURE WELLS AND FLOW LINES

[75] Inventors: Shelby P. Sharp, Tulsa, Okla.; Lyman Yarborough, Naperville, Ill.

[73] Assignee: Standard Oil Company (Indiana), Chicago, Ill.

[21] Appl. No.: 43,517

[22] Filed: May 29, 1979

[51] Int. Cl.³ .................. E21B 43/00; C23G 5/02
[52] U.S. Cl. .................. 252/8.55 B; 166/312; 252/8.55 E; 299/4; 299/5
[58] Field of Search .............. 252/8.55 B, 364; 166/312; 299/4, 5

[56] References Cited

U.S. PATENT DOCUMENTS

| | | | |
|---|---|---|---|
| 3,314,999 | 4/1967 | Bapseres et al. | 260/608 |
| 3,331,657 | 7/1967 | Peter et al. | 423/242 |
| 3,393,733 | 7/1968 | Kuo et al. | 166/267 |
| 3,531,160 | 9/1970 | Fisher | 299/5 |
| 3,545,916 | 12/1970 | Deicher et al. | 423/228 |
| 3,744,565 | 7/1973 | Brown | 166/267 |
| 3,846,311 | 11/1974 | Sharp et al. | 252/8.55 |
| 3,909,422 | 9/1975 | Sample | 252/8.55 |
| 3,913,678 | 10/1975 | Blount et al. | 166/310 |

OTHER PUBLICATIONS

Brown et al., Article in *The Oil and Gas Journal*, vol. 57, No. 4, Oct. 26, 1959, pp. 73–78.
Kirk–Othmer, *Encyclopedia of Chemical Technology*, 3rd Ed., vol. 2, pp. 283–295.

*Primary Examiner*—Herbert B. Guynn

[57] ABSTRACT

A relatively nonvolatile, high molecular weight sulfur solvent produced by activating a dialkyl disulfide oil by the addition of a relatively high molecular weight predominantly aliphatic amine (e.g., a N-alkyl-1,3-propane diamine) and optionally further increasing the molecular weight by the addition of elemental sulfur. Such a sulfur solvent is particularly useful in sustaining a liquid phase at bottomhole conditions for high temperature, high pressure sour gas.

5 Claims, 2 Drawing Figures

METHOD AND COMPOSITION FOR REMOVING ELEMENTAL SULFUR FROM HIGH TEMPERATURE, HIGH PRESSURE WELLS AND FLOW LINES

BACKGROUND OF THE INVENTION

1. Field of the Invention

The present invention relates to an improved sulfur solvent system for use in high temperature, high pressure wells. More specifically, it is concerned with a fatty amine activated dialkyl disulfide oil capable of sustaining a liquid sulfur dissolving phase at high temperature, high pressure bottomhole conditions.

2. Description of the Prior Art

The problems associated with sulfur depositing and accumulating in sour gas distillate wells which result in plugging the formation, tubing string, and surface equipment and reducing the desired flow of fluids therefrom, are well known. Whenever a natural formation contains high concentrations of hydrogen sulfide and elemental sulfur, safeguards to inhibit the precipitation of elemental sulfur and methods to remove sulfur blockage during production are employed. The prior art proposes various methods for using various types of sulfur solvents, for example, aromatic hydrocarbons such as benzene, toluene, xylene, and naptha, and the classical sulfur solvent carbon disulfide. Thus, U.S. Pat. No. 3,744,565 teaches the use of a saturated and unsaturated cyclohydrocarbon while U.S. Pat. No. 3,393,733 exemplifies the use of carbon disulfide.

During the past decade, various methods based on the ability of elemental sulfur to form polysulfides and thus be removed in the polysulfide form have been suggested and have experienced limited commercial success. In U.S. Pat. No. 3,331,657 an aqueous alkali metal or ammonium hydroxide caustic solution is employed to react, in situ, with hydrogen sulfide forming the corresponding alkali sulfide which then prevents or removes elemental sulfur by forming the polysulfide. U.S. Pat. No. 3,909,422 suggests a further improvement in the inorganic caustic reaction by employing a wetting agent in combination with the alkali hydroxide. Similarly, U.S. Pat. No. 3,545,916 proposes the use of a basic aqueous solution containing high concentrations of either an alkyl amine (e.g., ethyl amine, etc.) or aromatic nitrogen containing heteronuclear cyclic compound (e.g., pyridine, etc.) to prevent the precipitation of sulfur by virtue of the formation of polysulfides. In U.S. Pat. No. 3,913,678, the polysulfide forming property of ethyl amine is again employed in combination with a complexing agent such as EDTA to inhibit scale formation and sulfur deposits during sour gas well production. While in U.S. Pat. No. 3,531,160, elemental sulfur deposits in sour gas-sulfur wells is removed by circulating a liquid alkyl sulfide, alkyl disulfide, or alkyl polysulfide in the well.

U.S. Pat. No. 3,846,311, which involves a common coinventor relative to the present invention, is of particular interest to the present invention in that it represents the starting point from which the present invention developed. In this commonly assigned patent, a method for increasing the amount of sulfur which a given quantity of dialkyl disulfide solvent will dissolve is disclosed. The method requires that the dialkyl disulfide be catalyzed by the addition of a small amount of a lower aliphatic amine followed by an aging process. Such a solvent, produced in accordance with this reference, will exhibit an outstanding ability to dissolve sulfur with ultimate sulfur solubilities of as high as five times as much sulfur being dissolved on a weight basis as there was weight of original dialkyl disulfide. Such compositions have now been employed commercially to replace the more dangerous carbon disulfide sulfur solvents. However, the commercial success has been somewhat limited in that certain high temperature, high pressure ultra deep sour gas wells have been encountered wherein the amine activated dialkyl disulfide solvents have been ineffective, thus necessitating a resumption of the use of carbon disulfide solvent. It is presently felt that the failure of the amine activated dialkyl disulfide solvents in the high temperature, high pressure wells can be directly attributed to the fact that these previous sulfur solvents do not create sufficient liquid phase at bottomhole conditions to be effective in removing the sulfur deposits.

With ever increasing world energy demands and the advent of international fuel shortages, the oil and gas industry has been forced to drill deeper and deeper into more hostile environments in search of critically needed fuel. As a result, high temperature, high pressure deep horizon sour gas fields, potentially involving gas wells of interest in the present invention, have been discovered throughout the world. For example, high pressure deep sour gas wells have been encountered in Canada, France, West Germany, and Austria, as well as in Mississippi, Texas, and Oklahoma. As a general rule of thumb, at bottomhole temperatures in excess of 250° F. and bottomhole pressures of the order of 4000 psi, one can anticipate sulfur deposit removal problems during production. Such conditions are now being frequently exceeded, particularly when the depth of the well approaches 20,000 ft.

SUMMARY OF THE INVENTION

In view of the problems associated with the use of an amine activated dialkyl disulfide sulfur solvent to remove sulfur deposits in certain high temperature, high pressure sour gas wells, because of the inability of these solvents to exist in a liquid phase at bottomhole conditions, we have developed a method of dissolving such sulfur deposits involving the steps of:

(a) preparing a relatively nonvolatile, high molecular weight fatty amine activated dialkyl disulfide sulfur solvent capable of existing in a liquid phase at the bottomhole conditions consisting of a dialkyl disulfide to which has been added an amount in excess of 30 parts by weight of a fatty amine, having in excess of twelve carbon atoms in the aliphatic moiety, per 100 parts by weight dialkyl disulfide, and (b) injecting said relatively nonvolatile, fatty amine activated dialkyl disulfide sulfur solvent prepared in step (a) into said sour gas well to dissolve and thus remove the sulfur deposit.

In one aspect of the invention, the improved sulfur solvent is injected into the bottomhole formation and the well is closed in stopping production to allow the solvent to soak and remove the sulfur deposits. In another aspect of the invention a small but effective amount of sulfur solvent is continuously injected into the downhole formation or production string while producing such as to remove sulfur deposits and inhibit or prevent formation of additional sulfur deposits. Still, in a third aspect of the invention, the presence of sulfur deposits is monitored and continuous injection is alternated with the soaking technique as needed for the particular well. In all aspects of the present invention, a liquid phase sulfur solvent is achieved at bottomhole conditions by virtue of incorporating a fatty amine into the dialkyl disulfide prior to injecting it into the sour gas well.

Thus, the primary objective of the present invention is to provide a fatty amine activated dialkyl disulfide sulfur solvent wherein the volatility of the solvent can be tailored according to the need of the particular sour gas well to be treated such that upon injection of small volumes of the solvent, a liquid sulfur dissolving phase will exist at the hostile bottomhole conditions of the well. An additional objective is the utilization of such a sulfur dissolving liquid phase in high temperature, high pressure sour gas wells to remove and prevent elemental sulfur deposits which tend to reduce rates of production. Additional objectives should be obvious to one of ordinary skill in treating sulfur plug formations and production equipment upon complete reading of the specification and associated claims.

DESCRIPTION OF PREFERRED EMBODIMENTS

Figure 1:
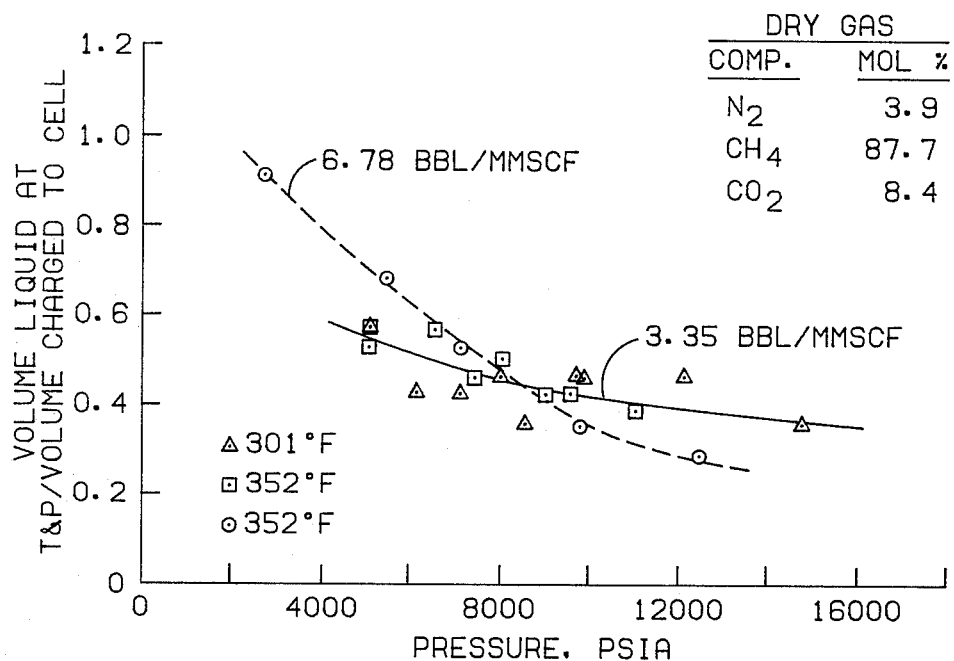
FIG. 1 of the drawing illustrates the volume factor as a function of pressure for Duomeen ® T activated dialkyl disulfide oil at two temperatures and two dry gas flow rates when 149 grams of Duomeen T are added per 50 grams of disulfide oil.

We have discovered that when a relatively high molecular weight amine (a fatty amine) is used to activate a dialkyl disulfide, a heavy amine activated dialkyl disulfide oil results which is capable of existing in the liquid phase at bottomhole conditions characteristic of the sour gas wells of interest. This heavy oil is found to be an effective sulfur solvent when employed in sour gas wells of interest. It is believed that the fatty amine is chemically bound to the dialkyl disulfide thus creating the desired high molecular weight and associated low volatility. Consequently, a liquid phase is observed at high temperature and high pressure in the presence of high sour gas flow rate even though relatively small quantities of the solvent are being employed. By selecting the amount of fatty amine, the degree of volatility can be controlled and the composition can be tailored to the needs of the particular gas well, thus insuring the presence of a liquid phase at bottomhole conditions.

Preparation of the sulfur solvent according to the present invention can be accomplished in a variety of manners provided two key features are present. First, the major constituent is selected from a class of compounds or mixtures of compounds which for purposes of this invention we have chosen to refer to as dialkyl disulfides. And second, sufficient fatty amine is incorporated into the dialkyl disulfide, prior to injection into the well, such as to reduce the volatility of the resulting amine activated dialkyl disulfide to the extent that a liquid phase will exist at bottomhole conditions.

The dialkyl disulfides useful as starting materials in preparing the improved sulfur solvent of the present invention can be viewed as involving a pair of alkyl radicals (R and R') bonded to a disulfide unit as represented in the formula R—S—S—R'. Such compounds are also referred to in the chemical literature as alkyl disulfides, thus the terms should be considered equivalent for purposes of this invention. The individual dialkyl disulfide includes such compounds as dimethyl disulfide, diethyl disulfide, dioctyl disulfide, ditertiary tetradecyl disulfide, and the like. One particularly useful starting material is a mixture of aliphatic disulfides in which the aliphatic group therein contains from about 2 to 11 carbon atoms; e.g., $(C_2H_5S)_2$, $(C_{11}H_{23}S)_2$, etc., typically those disulfide mixtures produced as a product stream of the Merox ® process described in the *Oil and Gas Journal,* vol. 57, pp. 73–78, Oct. 26, 1959. Such mixtures of disulfides are produced by first contacting a refinery hydrocarbon stream containing aliphatic mercaptans with a caustic solution to produce corresponding sodium salts of the mercaptans. The latter are then converted to dialkyl disulfides by air oxidation, simultaneously regenerating the caustic.

The addition of the high molecular weight essentially aliphatic amine (fatty amine) to the dialkyl disulfide oil in order to produce the high molecular weight relatively nonvolatile sulfur solvent composition of the present invention is somewhat analogous to the known lower alkyl amine activation of dialkyl disulfides in order to produce sulfur solvents. Examples of such processes are described in U.S. Pat. Nos. 3,314,999 and 3,846,311 and are here incorporated by reference as being descriptive of the alternate methods of activating the dialkyl disulfide with an amine. In the U.S. Pat. No. 3,314,999 a method for increasing the quantity of dissolved sulfur in a dialkyl disulfide sulfur solvent is described involving the addition of a lower aliphatic amine (an alkyl amine having 1 to 7 carbon atoms) at very low concentrations (0.04 to 5.0 weight percent) at a temperature between 0° C. and the boiling point of the dialkyl disulfide. In the U.S. Pat. No. 3,846,311, a method for achieving ultra-high sulfur dissolving capacity is described involving the addition of up to 10% by weight of a normally liquid saturated unsubstituted aliphatic amine containing 4 to 12 carbon atoms to a dialkyl disulfide and then aging this mixture to achieve the desired sulfur solvency. Although these methods are descriptive of the amine activation of the dialkyl disulfide of the present invention, several critical differences exist. By far the most important distinction is that the compositions produced in the prior art are incapable of sustaining a liquid phase at the conditions characteristic of the gas wells of interest, whereas the compositions of the present invention do exist in a liquid phase under the same conditions. This phase behavior difference is a consequence of the composition distinctions involved in preparing the amine activated dialkyl disulfide. Specifically, the amine used in the present invention is a high molecular weight amine having in excess of 12 carbon atoms in the aliphatic moiety. Also, the amine is incorporated into the dialkyl disulfide at a concentration level far in excess of what has previously been employed.

The high molecular weight amines or fatty amines useful in the present invention are in principle long chain alkyl amines usually synthesized from naturally occurring fatty acids wherein the alkyl group involved contains 12 or more carbon atoms. The commercially available fatty amines will contain mixtures of alkyl chain lengths since they are derived from fatty acids occurring in nature. Frequently this will also result in an abundance of the even carbon numbered species and the presence of unsaturation such as found in the oleic, palmitic, and the like structures. However, any long chain predominantly aliphatic amine, whether it be a single species with either even or odd numbered carbon atoms or mixtures of these species, is viewed as an acceptable high molecular weight amine for purposes of this invention. These fatty amines are preferably waxy solids or semi-solids which are easily melted at temperatures characteristic of the gas wells of interest. The preferred amines will involve carbon chain links of 16 through 30 carbon atoms. This preferred range is consistent with the present view that increasing the molecular weight in order to decrease volatility is of paramount importance in achieving the desired liquid phase at bottomhole high temperatures and high pressures. In cases where the fatty amine is a liquid at room temperatures (i.e., fatty amines having alkyl chain links predominantly at the lower end of the acceptable range; e.g., approaching $C_{12}$). The addition of elemental sulfur to the amine activated dialkyl disulfide may be necessary to achieve the desired high molecular weight heavy oil which is capable of existing as a liquid film forming phase at the severe conditions of interest. A subclass of fatty amines which have been found to be particularly useful in the present invention is the N-alkyl-1,3-propane diamines. For a more complete discussion of the high molecular weight aliphatic amines, the respective chemical identities, commercial sources, physical and chemical properties, known uses, and methods of synthesis, the FATTY AMINES chapter starting on page 283 of the 3rd Edition, Volume 2 of the KIRK-OTHMER, "Encyclopedia of Chemical Technology" is here incorporated by reference.

Although the prior art teaches the use of lower alkyl amines to activate the dialkyl disulfide and views the $C_4$ through $C_{12}$ alkyl amines as uniquely suitable for such purposes, we now believe that any aliphatic amine can be chemically incorporated into the dialkyl disulfide according to what appears to be a specific chemical reaction common to all aliphatic amines and dialkyl disulfides. This belief is in part based on the present discovery that fatty amines, when added to the dialkyl disulfide, appreciably affect the phase behavior at high temperatures and pressures implying chemical bonding and in part to the experimental evidence relating to monitoring the vapor pressure of the aliphatic amine during the amine activation of the dialkyl disulfide (when employing an amine that has a detectable vapor pressure; e.g., diethylamine). It has been observed that when monitoring the vapor pressure of diethylamine during activation of the Merox mixture at low concentrations the vapor pressure initially increases during heating and then drops off to a very low value indicative of the amine being chemically reacted with the dialkyl disulfide. By repeating this procedure at incrementally increasing quantities of amine, it has been observed that an apparent two moles of dialkyl disulfide per one mole of nitrogen amine is the upper stoichiometric quantity of amine being incorporated into the amine activated dialkyl disulfide. Under previous conditions, when using the lowest molecular weight aliphatic amines and dialkyl disulfides, this upper stoichiometric ratio roughly corresponds to 10% by weight amine (similar to what has been acknowledged in the previous patent literature).

In practicing the present invention, although it is believed that achieving the full stoichiometric incorporation of amine nitrogen is desirable, significant liquid phase has been observed at high temperatures and high pressures with as little as approximately 50% stoichiometric quantities of fatty amines. Using the Merox mixture, 50% stoichiometry corresponds to about 30 to 45 parts by weight high molecular weight amine per 100 parts by weight dialkyl disulfide, depending on the particular molecular weight of the amine. Furthermore, the desired liquid phase has been observed at bottomhole conditions at amine concentrations ten-fold of the lower values (300 parts by weight amine per 100 parts by weight dialkyl disulfide), certainly in excess of the believed stoichiometry.

In order to confirm the presence of the necessary liquid film forming phase at high temperatures and pressures, a series of phase distribution tests in a variable volume windowed PVT cell were performed. Table I presents the data related to the preparation of fatty amine activated dialkyl disulfide oils, some of which were used during the phase distribution tests.

TABLE I

| Sample | Weight of Disulfide[2] Oil, gms | Weight of Fatty Amine[1] gms | Weight of Sulfur gms | Maximum Temperature to Dissolve Sulfur | Weight of Wet Sulfur When Cooled to 76° F., gms |
|---|---|---|---|---|---|
| 1 | 100 | 14.7 | 260 | 200 | 165.2 |
| 2 | 100 | 14.9 | 100 | 200 | 0 |
| 3 | 100 | 14.7 | 110 | 300 | 12.6 |
| 4 | 50 | 149.0 | 60 | 200 | 0 |
| 5 | 50 | 149.0 | 0 | 200 | — |
| 6 | 100 | 45.1 | 0 | 200 | — |

[1] N-alkyl-1, 3-propane diamine ($RNHCH_2CH_2CH_2NH_2$) wherein the alkyl group (R) is derived from tallow having an average carbon number of about 18, sold under the trade name Duomeen® T by Armak.
[2] Merox® disulfide oil produced by Warren Petroleum Company at their Baytown Plant.

In preparing the five amine activated dialkyl disulfide oils of Table I, the quantity of fresh dialkyl disulfide oil, as specified in the second column, was placed in a 500 ml reaction flask to which was then added the respective amount of fatty amine as found in the third column. Because of insufficient available volume in the 500 ml reaction flask, the weight of the reactants in the Samples 4 and 5 were reduced by a factor of two. The particular disulfide oil employed was a Merox mixture of dialkyl disulfides produced at Warren Petroleum's Baytown Plant. A typical compositional distribution of such a Merox mixture is illustrated in Table II.

TABLE II

| Component | Weight Percent | Mol Percent |
|---|---|---|
| Diethyl Disulfide | 9.0 | 13.44 |
| Dipropyl Disulfide | 13.3 | 16.15 |
| Dibutyl Disulfide | 32.5 | 33.26 |
| Dipentyl Disulfide | 33.9 | 29.97 |
| Dihexyl Disulfide | 8.5 | 6.62 |
| Diheptyl Disulfide | 0.85 | 0.56 |

The particular fatty amine employed to activate the dialkyl disulfide mixture was a N-alkyl-1, 3-propane diamine supplied by Armak of Chicago under the trade name Duomeen T. This fatty amine is described as a N-tallow-1, 3-propane diamine having the general formula; $RNHCH_2CH_2NH_2$. The compositional distribution of a typical mixture of alkyl radicals (the R in the above formula) and some typical properties of this fatty amine is presented in Table III.

TABLE III

| Typical Properties of Duomeen ® T | | | | | | |
|---|---|---|---|---|---|---|
| Alkyl Chain Length Distribution | (%) | Apparent Molecular Weight | B.P. °C. | M.P. °F. | Specific Gravity (25° C.) | Iodine Valve Min. Max. |
| Dodecyl $C_{12}$ | 1.0 | 350 | 300 | 195 | 0.841 | 32    45 |
| Tetradecyl $C_{14}$ | 3.0 | | | | | |
| Pentadecyl $C_{15}$ | 0.5 | | | | | |
| Hexadecyl $C_{16}$ | 29.0 | | | | | |
| Septadecyl $C_{17}$ | 1.0 | | | | | |
| Octadecyl $C_{18}$ | 23.0 | | | | | |
| Tetradecenyl $C_{14'}$ | 1.0 | | | | | |
| Hexadecenyl $C_{16'}$ | 3.0 | | | | | |
| Octadecenyl $C_{18'}$ | 37.0 | | | | | |
| Octadecadienyl $C_{18''}$ | 1.5 | | | | | |

In preparing the various samples in Table I, three different relative amounts of fatty amine per 100 grams of dialkyl disulfide oil were selected such as to reflect below stoichiometric amount, stoichiometric amount and excess of stoichiometric amount of amine. Since the particular fatty amine employed has two amine nitrogens and since each is believed to be chemically active in promoting dialkyl disulfide oils according to what has already been described as a reaction involving two mols of dialkyl disulfide per 1 mol of nitrogen amine, the Samples 1, 2, and 3 represent what is believed to be approximately ⅓ stoichiometric amount of amine, while Samples 4 and 5 represent over 6 times stoichiometric amine, and Sample 6 represents stoichiometry.

Samples 1 through 4 were further tested by the addition of a pulverized elemental sulfur. In confirming the sulfur dissolving capacity of the compositions, the respective amounts of pulverized sulfur were added to freshly activated Merox solutions without aging. The sulfur dissolution was performed by heating and occasional shaking. Upon cooling to room temperature the weight of wet sulfur precipitate was measured and is recorded in Table I. The data found in the last three columns of Table I clearly establish that the fatty amine activated dialkyl disulfide oil acts as a sulfur solvent. The sulfur solvent properties are extremely analogous to what has been previously known relative to the promotion of the sulfur solvency of dialkyl disulfides by the use of lower molecular weight amines.

In order to verify the presence of the liquid phase at high pressures and high temperatures, characteristic of the bottomhole conditions of the wells of interest in the present invention, Samples 5 and 6 of Table I were selected for testing in the presence of a dry gas in a high pressure variable volume PVT windowed cell. Initially, the PVT cell was charged with 2.83 cc of Duomeem T activated disulfide oil (Sample 5) at 1,500 psia and 90° F. (32.2° C.) and 6.346 gm mols of a gas having a composition of Table IV.

TABLE IV

| Component | Mol Percent |
|---|---|
| $N_2$ | 3.9 |
| $CH_4$ | 87.7 |
| $CO_2$ | 8.4 |

This particular composition corresponds to 3.35 barrels of amine activated dialkyl disulfide oil being injected into a dry gas well per million standard cubic feet of dry gas being produced from the well (Bbl/MMSCF). The PVT cell was held at 301° F. (149° C.) while the volume was varied such that the pressure in the cell ranged from approximately 5,000 psia up to 15,000 psia and then back to 5,000 psia. The total volume of the cell and the volume of the liquid phase present in the cell were recorded at various pressures and are presented in Table V and FIG. 1.

The temperature of the PVT cell was then elevated to 352° F. (178° C.) and the volume again varied such that the pressure ranged from approximately 5,000 psia up to 11,000 psia and then back to 5,000 psia. The total volume and the volume of the liquid phase as a function of pressure for this temperature are also presented in Table V and FIG. 1.

Finally, an additional run involving 5.72 cc of Duomeen T activated dialkyl disulfide (Sample 5) being charged into the PVT cell at 1,500 psia and 95° F. (35° C.) along with 6.346 gm mols of the gas from Table IV was performed. The composition involved in this run corresponds to 6.78 Bbl/MMSCF. The temperature was again held at 352° F. (178° C.) while the pressure ranged from approximately 2,700 psia up to 13,000 psia. Again the data is presented in Table V and FIG. 1. In discussing the significance of this data, it should be emphasized that there are at least two distinct compositional effects of features involved. The first is the overall gas to liquid ratio and the second is the relative quantity of amine to disulfide to sulfur used in preparing the polysulfide oil.

TABLE V

Phase Distribution Test Results for Duomeen ® T Activated Dialkyl Disulfide Oil With Dry Gas at 301 and 352° F.; 149 gm Duomeen ® T/50 gm Dialkyl Disulfide Oil

| Pressure, psia | Total Volume, cc | Liquid Volume, cc | Volume Percent Liquid | Volume Liquid at T&P per Volume Oil Charged |
|---|---|---|---|---|
| 3.5 Bbl Oil/MMSCF Gas 301° F. | | | | |
| 5,058 | 684.30 | 1.6 | 0.23 | 0.565 |
| 6,111 | 594.25 | 1.2 | 0.20 | 0.425 |
| 7,078 | 538.18 | 1.2 | 0.22 | 0.425 |
| 8,541 | 479.61 | 1.0 | 0.21 | 0.354 |
| 9,848 | 443.76 | 1.3 | 0.27 | 0.460 |
| 12,076 | 400.82 | 1.3 | 0.32 | 0.460 |
| 14,720 | 365.80 | 1.0 | 0.27 | 0.354 |
| 9,680 | 447.30 | 1.3 | 0.29 | 0.460 |
| 8,000 | 497.95 | 1.3 | 0.26 | 0.460 |
| 5,067 | 683.46 | 1.6 | 0.23 | 0.565 |
| 352° F. | | | | |
| 5,070 | 742.93 | 1.6 | 0.22 | 0.565 |
| 6,530 | 613.78 | 1.6 | 0.26 | 0.565 |
| 8,046 | 534.71 | 1.4 | 0.26 | 0.495 |
| 9,507 | 483.80 | 1.2 | 0.25 | 0.425 |
| 11,001 | 444.16 | 1.1 | 0.25 | 0.388 |
| 8,960 | 498.41 | 1.2 | 0.24 | 0.425 |
| 7,394 | 559.33 | 1.3 | 0.23 | 0.460 |
| 5,054 | 740.43 | 1.5 | 0.20 | 0.530 |
| 6.78 Bbl Oil/MMSCF Gas | | | | |

TABLE V-continued

Phase Distribution Test Results for Duomeen ® T Activated Dialkyl Disulfide Oil With Dry Gas at 301 and 352° F.; 149 gm Duomeen ® T/50 gm Dialkyl Disulfide Oil

| Pressure, psia | Total Volume, cc | Liquid Volume, cc | Volume Percent Liquid | Volume Liquid at T&P per Volume Oil Charged |
|---|---|---|---|---|
| 352° F. | | | | |
| 2,698 | 1,299.98 | 5.2 | 0.40 | 0.908 |
| 5,540 | 695.36 | 3.9 | 0.56 | 0.681 |
| 7,092 | 582.70 | 3.0 | 0.51 | 0.524 |
| 9,780 | 477.96 | 2.0 | 0.42 | 0.350 |
| 12,399 | 421.21 | 1.6 | 0.38 | 0.280 |

As indicated in the third column of Table V, a significant amount of liquid phase was present through the entire pressure range at all tested conditions. This establishes that the critically needed liquid phase will exist at bottomhole conditions. The fifth column represents the ratio of volume of liquid at the specified temperature and pressure per volume of amine activated dialkyl disulfide injected. Such data is of practical importance for designing a commercial well treatment in that it quantitatively reflects the relative volume of liquid phase remaining at various pressures (depths) in the well when 3.5 and 6.78 Bbls of oil are injected per MMSCF of dry gas produced.

A second phase distribution test was performed using the Duomeen T activated dialkyl disulfides of Sample 6 in Table I. The PVT cell was charged with 3.10 cc of Sample 6 at 1,600 psia and 100° F. (38° C.) along with 6.901 gm mols of a dry gas having a composition of Table VI.

TABLE VI

| Component | Mol Percent |
|---|---|
| $N_2$ | 4 |
| $CH_4$ | 87 |
| $CO_2$ | 9 |

Figure 2:
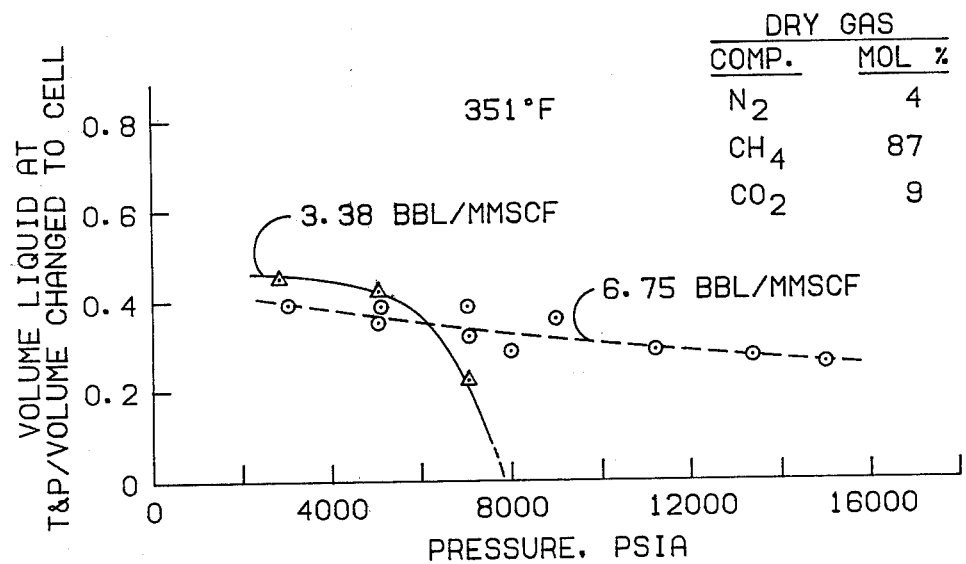
FIG. 2 of the drawing illustrates the volume factor similar to FIG. 1 at 45.1 grams of Duomeen T per 100 grams of disulfide oil.

This particular composition corresponds to 3.38 Bbl oil/MMSCF gas. The PVT cell was held at 351° F. (177° C.) while the volume was varied such that the pressure in the cell ranged from approximately 2,800 psia to 9,000 psia. The test was terminated at the 9,000 psia value because of the disappearance of the liquid phase at these conditions. At this time, a second run was performed at an increased amine activated dialkyl disulfide concentration. The second run involved 6.20 cc of Sample 6 being introduced into the cell at 1600 psia and 105° F. (38° C.) along with 6.091 gm mols of the dry gas of Table VI. This composition corresponds to 6.75 Bbls oil/MMSCF gas. Again, the temperature was held at 351° F. (177° C.) while the pressure ranged from approximately 3,000 psia to 15,000 psia and then back to 3,000 psia. The data for both runs are presented in Table VII and FIG. 2.

TABLE VII

Phase Distribution Test Results for Duomeen ® T Activated Dialkyl Disulfide Oil with Dry Gas at 351° F.; 45.1 Grams Duomeen ® T/100 Grams Dialkyl Disulfide

| Pressure, psia | Total Volume, cc | Liquid Volume, cc | Volume Percent Liquid | Volume Liquid at T&P per Volume Oil Charged |
|---|---|---|---|---|
| 3.38 Bbl Oil/MMSCF Gas | | | | |
| 2,874 | 1,308.58 | 1.4 | 0.11 | 0.451 |
| 5,054 | 796.01 | 1.3 | 0.16 | 0.419 |
| 7,040 | 621.59 | 0.7 | 0.11 | 0.226 |
| 9,017 | 530.62 | 0 | 0 | 0 |
| 6.75 Bbl Oil/MMSCF Gas | | | | |
| 3,044 | 1,242.07 | 2.4 | 0.19 | 0.387 |
| 5,098 | 793.09 | 2.4 | 0.30 | 0.387 |
| 7,012 | 625.76 | 2.4 | 0.38 | 0.387 |
| 8,999 | 533.54 | 2.2 | 0.41 | 0.355 |
| 11,179 | 464.69 | 1.8 | 0.39 | 0.290 |
| 13,373 | 431.73 | 1.7 | 0.39 | 0.274 |
| 15,093 | 407.94 | 1.6 | 0.39 | 0.258 |
| 7,987 | 573.18 | 1.8 | 0.31 | 0.290 |
| 7,063 | 621.38 | 2.0 | 0.32 | 0.322 |
| 5,070 | 794.75 | 2.2 | 0.28 | 0.355 |
| 3,034 | 1,245.20 | 2.4 | 0.19 | 0.387 |

In contrast to the previous Sample 5's behavior at 3.38 Bbl/MMSCF wherein a liquid phase was present up to approximately 15,000 psia, the Sample 6 test shows no liquid phase at 3.38 Bbl/MMSCF when pressures of 9,000 psia were achieved. This behavior is further illustrated by comparing FIG. 1 with FIG. 2 and noticing where the 3.38 Bbl/MMSCF curve on FIG. 2 drops to zero. The practical significance of this observation is that the composition of 3.38 Bbls of Sample 6 (i.e., approximate stoichiometric amounts of amine activator) in one MMSCF of gas has an upper pressure limit above which no liquid phase will exist. Consequently, you would not expect the composition of 3.38 Bbls of Sample 6 per one MMSCF of gas to be effective as a corrosion inhibitor or corrosion inhibitor carrier if injected in a dry gas well at a depth that corresponds to a pressure in excess of 9,000 psia. However, this does not mean that the composition of Sample 6 is ineffective for purposes of this invention. The second run corresponding to an injection rate of 6.75 Bbl/MMSCF clearly shows significant liquid phase over the entire pressure range of 3,000 to 15,000 psia (see FIG. 2).

From the composite of all phase distribution data presented here in combination with the sulfur solvency property, certain basic concepts relative to the practice of the present invention can be established. First and foremost, the use of a fatty amine to activate a dialkyl disulfide oil results in compositions which will exist in the liquid phase under the severe high temperature and high pressures associated with the deep dry gas wells of interest. Consequently, the injection of such a liquid phase sulfur solvent into the well will result in the removal of sulfur deposits and suppression of further sulfur deposition. Furthermore, significant volumes of liquid phase can be maintained at bottomhole conditions in the presence of very high rates of dry gas production with as little as 3 to 4 barrels of injected oil/MMSCF of dry gas being produced. Thus it is felt that the use of the fatty amine to activate the dialkyl disulfide oil significantly reduces the volatility of the resulting amine activated dialkyl disulfide oil such that this oil will exist in a liquid phase when injected into deep hot dry gas wells.

When comparing the data related to the 3.38 Bbl/MMSCF run as found in Table VII with the results of the 6.75 Bbl/MMSCF run, it can be concluded that increasing the amount of the amine activated dialkyl disulfide oil not only increases the volume of liquid phase present, but also extends the pressure range at which the required liquid phase will exist to higher pressure values. In other words, as a general rule, increasing the rate of the injection of the amine activated dialkyl disulfide oil will insure the presence of a protective film as the pressure increases.

Comparison of the data found in Table V to that in Table VII shows that an excess of fatty amine activator (over stoichiometry) further enhances the presence of the required liquid phase. As previously stated, further reduction of the volatility of the amine activated dialkyl disulfide, thus additional insurance that the liquid phase will be present, can be achieved by preloading the activated dialkyl disulfide solvent with dissolved elemental sulfur. Such a technique is believed to involve formation of an amine activated dialkyl polysulfide oil which exhibits extremely low volatility at bottomhole conditions of interest.

The actual injection of the sulfur solvent compositions of the present invention can be accomplished by any of the methods commonly practiced in the oil field for adding additives to downhole fluids. Since the desired liquid phase can be achieved at relatively small volumes of injected disulfide oil, the use of a spaghetti string injection system or the like is preferred.

Having thus described the preferred embodiments, the invention is not be construed as limited to the particular forms disclosed and tested, since these are to be regarded as illustrative rather than restrictive. Therefore, the following claims are intended to cover all processes which do not depart from the spirit and scope of using in high temperature, high pressure gas wells a relatively nonvolatile liquid formed from a dialkyl disulfide oil which was activated by a high molecular weight fatty amine thus producing a sulfur solvent.

We claim:

1. A method of dissolving a deposit of elemental sulfur in a high temperature, high pressure sour gas well, characterized in that a four to twelve carbon atom aliphatic amine activated dialkyl disulfide sulfur solvent will not exist in a liquid phase at bottomhole conditions of said well for sufficient time to effect the removal of said sulfur deposit, involving the steps of:
    (a) preparing a relatively nonvolatile, high molecular weight fatty amine activated dialkyl disulfide sulfur solvent capable of existing in a liquid phase at said bottomhole conditions consisting of a dialkyl disulfide to which has been added an amount in excess of 30 parts by weight of a fatty amine, having in excess of twelve carbon atoms, per 100 parts by weight dialkyl disulfide, and
    (b) injecting said relatively nonvolatile, high molecular weight fatty amine activated dialkyl disulfide sulfur solvent prepared in step (a) into said sour gas well to dissolve and thus remove said sulfur deposit.

2. A method for dissolving a deposit of elemental sulfur according to claim 1 wherein said injection of said relatively nonvolatile, high molecular weight fatty amine activated dialkyl disulfide sulfur solvent is continued such as to maintain a liquid phase at bottomhole conditions, thus suppressing any further sulfur deposit formation.

3. A method for dissolving a deposit of elemental sulfur according to claim 1 or claim 2 wherein said dialkyl disulfide is a mixture of dialkyl disulfides having alkyl groups containing from about 2 to about 11 carbon atoms and said sulfur solvent contains at least 80 parts by weight sulfur per 100 parts by weight dialkyl disulfide prior to injection.

4. A composition consisting essentially of a dialkyl disulfide or mixtures of dialkyl disulfides to which has been added an amount in excess of 30 parts by weight of a fatty amine, having in excess of twelve carbon atoms, per 100 parts by weight dialkyl disulfide.

5. A composition of claim 4 wherein said fatty amine is a N-alkyl-1,3-propane diamine and said dialkyl disulfide is a mixture of dialkyl disulfides wherein the alkyl radical contains from two to about eleven carbon atoms.

* * * * *